（12） United States Patent
Abou Rjeily (10) Patent No.: US 8,238,485 B2
(45) Date of Patent: Aug. 7, 2012

(54) MAXIMUM LIKELIHOOD DECODER FOR PULSE POSITION MODULATION MULTI-SOURCE SYSTEM

(75) Inventor: Chadi Abou Rjeily, Byblos (LB)

(73) Assignee: Commissariat a l'Energie Atomique, Paris (FR)

( * ) Notice: Subject to any disclaimer, the term of this patent is extended or adjusted under 35 U.S.C. 154(b) by 1204 days.

(21) Appl. No.: 12/070,953

(22) Filed: Feb. 21, 2008

(65) Prior Publication Data

US 2008/0212720 A1 Sep. 4, 2008

(30) Foreign Application Priority Data

Feb. 27, 2007 (FR) ...................................... 07 53531

(51) Int. Cl.
*H04L 27/06* (2006.01)
*H03M 13/03* (2006.01)
(52) U.S. Cl. ........................................ 375/341; 714/794
(58) Field of Classification Search .................. 375/261, 375/262, 285, 316, 340, 341, 229, 233, 232, 375/350, 239; 714/786, 794
See application file for complete search history.

(56) References Cited

U.S. PATENT DOCUMENTS

| | | | | |
|---|---|---|---|---|
| 2006/0083319 A1* | 4/2006 | Giannakis et al. | ............ | 375/259 |
| 2009/0232241 A1* | 9/2009 | Shabany et al. | ............... | 375/262 |
| 2009/0257530 A1* | 10/2009 | Shim et al. | .................... | 375/340 |
| 2010/0014606 A1* | 1/2010 | Chen et al. | .................... | 375/262 |

OTHER PUBLICATIONS

French Preliminary Search Report, FA 691403, FR 0753531, dated Nov. 26, 2007.
Abou-Rjeily, C. et al.: "MIMO UWB Communications Using Modified Hermite Pulses", Proc. of the $17^{th}$ Annual IEEE Internal Symposium on Personal, Indoor and Mobile Communications (PIRMC '06).
Damen, M.O. et al.: "On Maximum Likelihood Detection and the Search for the Closest Lattice Point", IEEE Trans. On Information Theory, vol. 49, No. 10, Oct. 2003, pp. 2389-2402.
Proakis, J.G.: "Digital Communications", $4^{th}$ Edition, pp. 242-247.
Viterbo, E., et al.: A Universal Lattice Code Decoder for Fading Channels, IEEE Transactions on Information Theory, vol. 45, pp. 1639-1642, Jul. 1999.

* cited by examiner

*Primary Examiner* — Tesfaldet Bocure
(74) *Attorney, Agent, or Firm* — Nixon Peabody LLP (57) ABSTRACT

In a sphere decoding process, P PPM symbols emitted simultaneously are represented by a point of the modulation product constellation in a space of signals transmitted of dimension MP decomposed into P layers, each layer representing M modulation positions. The signal received is transformed into a representative point. The point of the product constellation closest to the received point within a sphere of given quadratic radius is determined. For each layer of rank p, ZF-DFE equalization is carried out; sorting in a list of the M PPM symbols as a function of the contributions that they would make to the quadratic distance to the received point is then carried out, followed by selection of the PPM symbol making the lowest contribution. The contribution is added to those from previous layers to obtain a sum of contributions. These steps are repeated until the lowest layer is attained.

8 Claims, 6 Drawing Sheets

MAXIMUM LIKELIHOOD DECODER FOR PULSE POSITION MODULATION MULTI-SOURCE SYSTEM

CROSS-REFERENCE TO RELATED PATENT APPLICATION OR PRIORITY CLAIM

This application claims the benefit of a French Patent Application No. 07-53531, filed on Feb. 27, 2007, the disclosure of which is incorporated herein in its entirety by reference.

TECHNICAL FIELD

The present invention concerns the field of maximum likelihood decoding, more particularly for a multi-source system using a pulse position modulation.

STATE OF THE PRIOR ART

Receivers using a criterion of maximum likelihood, also known as ML (Maximum Likelihood) receivers, are well known in the field of telecommunications to be optimal when the transmission channel is Gaussian. A description of these receivers is found for example in the work of J. G. Proakis entitled "Digital communications", $4^{th}$ edition, pages 242-247. Maximum likelihood receivers have in particular been envisaged in the field of mobile telecommunications. In order to eliminate MAI (multi access interference), a ML receiver capable of simultaneously decoding the symbols emitted by the different users on the transmission channel (multi-user ML receiver) may be used. It can be shown that the estimation of the symbols transmitted by these users according to the criterion of maximum likelihood comes down to searching among the points of a network that which is the nearest to a point representative of the signal received in a space of dimension $M^K$ where M is the dimensionality of the modulation used by the K users. The network of points is generated by the modulation constellations of the different users. This method rapidly turns out to be complex for high K, so conventionally one resorts to a decoding known as "sphere decoding", which limits the search for the closest neighbour to the points of the network belonging to a noise sphere centred on the received point. A description of the sphere decoder may be found in the article of E. Viterbo et al. entitled "A universal lattice code decoder for fading channels" published in IEEE Transactions on Information Theory, vol. 45, pages 1639-1642, July 1999. The sphere decoding has been applied to systems using PAM or QAM type modulation constellations.

More recently, sphere decoding has been proposed for implementing MIMO (Multiple Input Multiple Output) system receivers. MIMO system is taken to mean a telecommunication system in which at least one emitter transmits information symbols by means of a plurality of antenna. The receiver may have a single antenna (MISO system, acronym of Multiple Input Single Output, is then more specifically used) or a plurality of antenna, the term MIMO being chosen here to designate indiscriminately these two configurations.

In the case of a MIMO system, the network of points is generated by the modulation constellations used to transmit the symbols by the different antenna. An example of an embodiment of sphere decoding for MIMO system is found in the article of M. O. Damen et al. entitled "On Maximum-Likelihood detection and the search for the closest lattice point" published in IEEE Trans. on Information Theory, Vol. 49, No 10, Oct. 2003, pages 2389-2402. In this sphere decoder, only PAM and QAM modulations are envisaged.

In the following description, the generic term multi-source designates equally well a multi-user configuration as a MIMO configuration. It will be understood that in the first case the sources represent the flow of symbols from or to the different users and, in the second case, the flow of symbols emitted by the different antennas. Obviously, these two cases may be combined when the terminals of the users are of multi-antenna type. Moreover, it will be assumed that the flow of symbols is synchronous.

The sphere decoding ML receiver will be described in the case of K users, each user $k \in \{1, \ldots, K\}$ transmitting by means of $i_k$ antenna to the receiver, i.e. a total number of $$P = \sum_{k=1}^{K} i_k$$

sources. The signal received may be expressed in the vectorial form:

$$x = Ha + n \quad (1)$$

where:

x is a vector of decision variables of dimension P' where P' is equal to the product of the number of antennas of the receiver with the number of decision variables observed per receiving antenna, for example the number of paths resolved per antenna.

a is a vector of size PM, obtained by the concatenation of vectors $a^{(1)}, a^{(2)}, \ldots, a^{(P)}$, each vector $a^{(p)}$, $p \in \{1, \ldots, P\}$ being the vectorial representation of the information symbol transmitted by the $p^{th}$ source and being of dimension M equal to the dimensionality of the modulation used;

H is the matrix of size P'×PM representing the transmission channel, it describes in particular the interferences between users and between paths from the different antenna;

n is a vector of dimension P', the components of which are samples of centred additive Gaussian white noise affecting the signal received.

The maximum likelihood receiver estimates the vector â minimising the quadratic deviation $\|x - Ha\|^2$ with the vector received, i.e.:

$$\hat{a} = \underset{a \in C^P}{\mathrm{argmin}} \|x - Ha\|^2 \quad (2)$$

where $C^P$ is the product constellation from the respective constellations of P sources.

It can be shown that the expression (2) may be written in the following manner:

$$\hat{a} = \underset{a \in C^P}{\mathrm{argmin}} \|z - Ra\|^2 \quad (3)$$

with $z = Q^T x$ and where Q and R are respectively a unit matrix of size P'×P and an upper triangular matrix of size P×P obtained by QR decomposition of the matrix H, in other words $R^T R = H^T H$.

For PAM or QAM constellations, it is still possible, by means of an elementary linear operation l, that we will later disregard, to end up with the case where the points of the constellation produced are elements of $Z^{MP}$ where Z is all of the relative integers and M the dimensionality of the modulation constellations. The vectors Ra may then be represented as the points of a network Λ of generating matrix R.

Sphere decoding consists in carrying out a search of the closest neighbour within a sphere (in a space of dimension MP) centred on the point representative of the signal received z. The search is carried out among the points of Λ included within this sphere.

The manner in which the candidates are successively selected (or enumerated) is critical for the performance of the decoding algorithm. Two enumeration techniques are essentially known, the first known as Pohst, the second known as Schnorr-Euchner.

A sphere decoding using a Pohst enumeration will firstly be described.

It will be assumed for the needs of illustration that the modulation is of PAM type, in other words that the space considered is of dimension P. It also applies to a QAM modulation, the dimension of the space then being 2P.

The search is carried out, dimension by dimension, or according to the usual terminology, layer by layer, by selecting in each layer the coordinate of a candidate point of Λ.

The contribution of the layer P to the quadratic distance (3) is simply equal to:

$$(z_P - r_{P,P} a_P)^2 \qquad (4)$$

In the same way, the contribution of the layer P−1 to this quadratic distance is expressed by:

$$(z_P - r_{P-1,P-1} - r_{P-1,P} a_P)^2 \qquad (5)$$

and, generally speaking, the contribution of the layer i is expressed by:

$$(z_i - r_{i,i} a_i - E_i)^2 \qquad (6)$$

with $E_i$ defined by $$E_i = \sum_{j=i+1}^{P} r_{i,j} a_j.$$

If $T_i$ designates the contribution of the successive layers $i+1, \ldots, P$, this may be obtained by descending recurrence:

$$T_{i-1} = T_i + |z_i - E_i - r_{i,i} a_i|^2 \qquad (7)$$

with $T_P = 0$.

With the previous conventions, the search in the sphere of quadratic radius d comes down to determining for each of the layers the values $a_i$ of Z confirming:

$$(z_i - r_{i,i} a_i - E_i)^2 + T_i \leq d \text{ for } i=P, \ldots, 1 \qquad (8)$$

or, in an equivalent manner:

$$\frac{z_i - E_i - \sqrt{d - T_i}}{r_{i,i}} \leq a_i \leq \frac{z_i - E_i + \sqrt{d - T_i}}{r_{i,i}} \qquad (9)$$

Finally, if the PAM constellation is around M' where M' is a power of 2 and if the above mentioned linear transformation is l(m')=2m'−1−M' for m'∈{1, . . . , M'}, the search may be reduced to the uneven integers belonging to the interval [$A_i$, $B_i$] where:

$$A_i = \max\left(1 - M', \left\lceil \frac{z_i - E_i - \sqrt{d - T_i}}{r_{i,i}} \right\rceil\right) \text{ and} \qquad (10)$$

$$B_i = \min\left(M' - 1, \left\lfloor \frac{z_i - E_i + \sqrt{d - T_i}}{r_{i,i}} \right\rfloor\right)$$

where $\lceil x \rceil$ is the smallest integer greater than x and $\lfloor x \rfloor$ is the biggest integer less than x.

This reduction in the search interval corresponds in fact to an intersection of the interval as defined in (9), with the projection of the constellation onto the dimension in question.

An interval of validity is thereby defined for each layer. It gives the maximal admissible excursion in this layer, considering the choice already made for the values $a_i$ in the upper layers.

Figure 1:
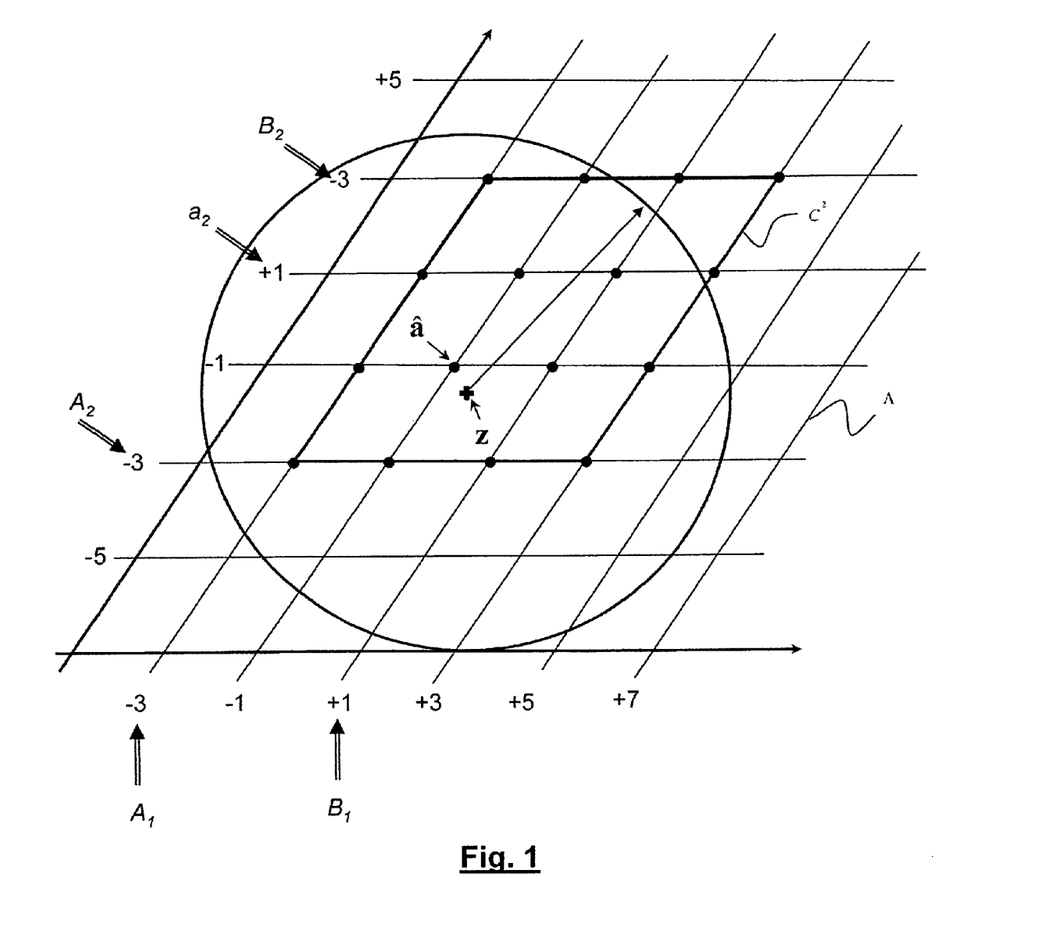
FIG. 1 illustrates the principle of a sphere decoding for a system with two PAM sources.

FIG. 1 represents the principle of the sphere decoder in the simple case where P=2 and M'=4. The sphere is centred on the point z represented by a cross. The points of the constellation produced $C^2$ are represented by full circles. The interval of validity [$A_2$,$B_2$] of the layer 2 is none other than the intersection of the projection of the sphere with that of the constellation, here [$A_2$,$B_2$]=[−3,3]. The interval of validity [$A_1$,$B_1$] is then determined by the choice of a value $a_2$ in [$A_2$,$B_2$]. It may thereby be seen in the example illustrated that for $a_2$=1, the interval of validity is [$A_1$,$B_1$]=[−3,1].

Figure 2:
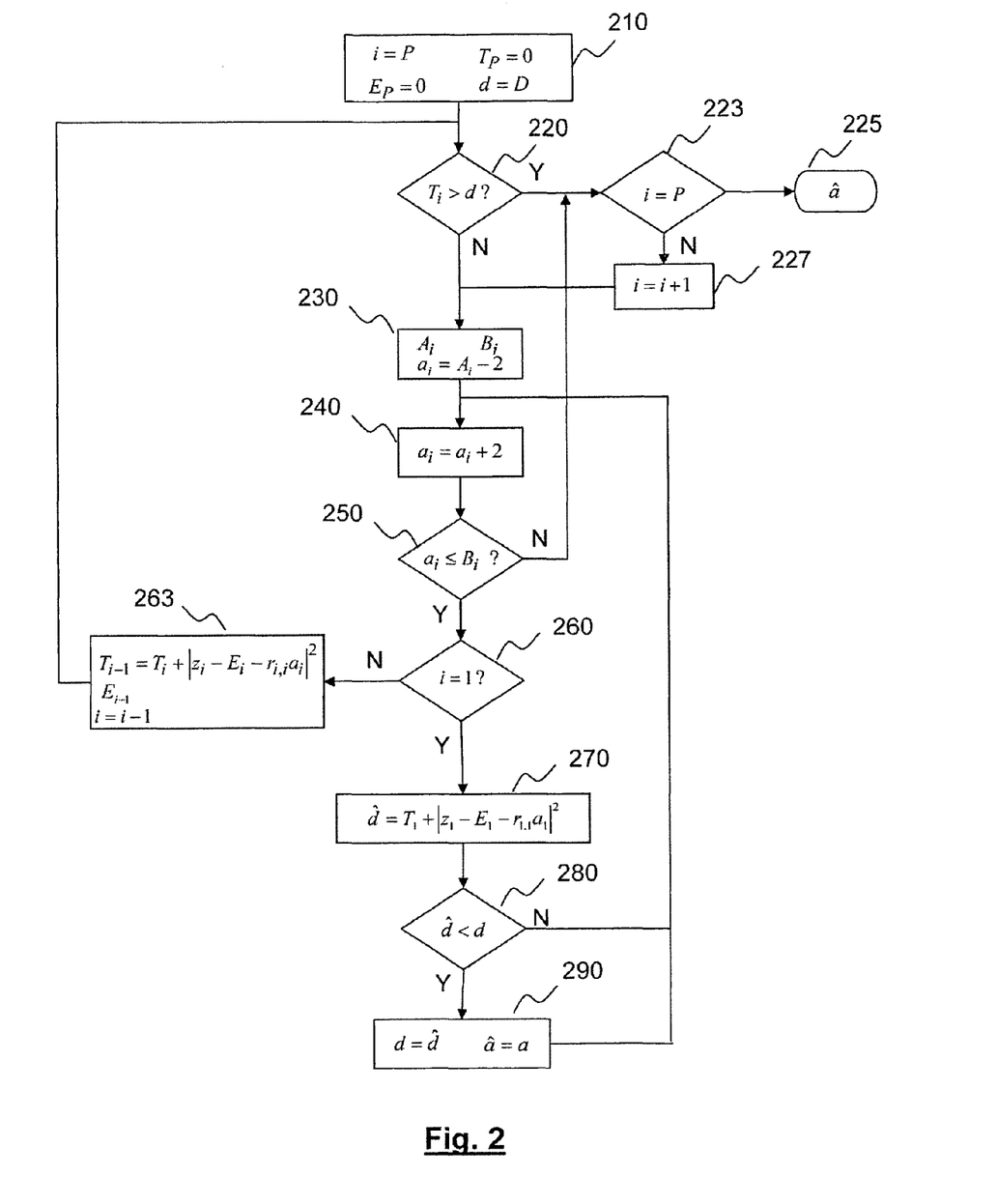
FIG. 2 represents the flow diagram of a first sphere decoding algorithm known from the prior art.

FIG. 2 represents a flow diagram of the sphere decoding method using a Pohst enumeration.

At step 210, the initialisation of the layer index, intermediate variables and search radius of the sphere are carried out, i.e.: i=P; $T_P$=0; $E_P$=0; d=D where D is the initial quadratic radius of the search sphere. D is chosen as a function of an estimation of the noise power.

At step 220, one tests if $T_i$>d, in other words if the interval is reduced to the empty assembly. If this is the case, one tests in 223 if i=P and in the affirmative the algorithm ends in 225. In the negative, one increments i by 1 and one moves on to step 230.

If $T_i$≦d, one calculates in 230 the bounds $A_i$ and $B_i$ according to (10) and one initialises $a_i$ by $a_i$=$A_i$−2.

At step 240, one increments $a_i$ by 2 and one tests in 250 if the corresponding point is still in the interval, i.e. $a_i$≦$B_i$. In the negative, one returns to the test 223 and in the affirmative one tests in 260 if i=1. If this is not the case, one moves on to step 263 in which i is decremented by 1 and the new values $E_{i-1}$ and $T_{i-1}$ are calculated. On the other hand, if one has reached the lowest layer, i=1, one adds in 270 the contribution of this latter layer to obtain the distance of the candidate selected at the point z, i.e. $\hat{d}$=$T_1$+|$z_1$−$E_1$−$r_{1,1}a_1$|$^2$. One compares in 280 this distance to the current quadratic radius d. If it is lower, one reduces the radius of the sphere in consequence d=$\hat{d}$ and one updates the best candidate â=a. In all cases, one then returns to step 240.

The algorithm detailed above carries out a search by scanning the intervals of validity layer by layer from their lower bounds towards their upper bounds, the fastest scanning being carried out in the highest layer (i=P) and the slowest in the lowest layer (i=1). At each selection of a new coordinate of candidate in a layer, the bounds of the intervals of validity of the upper layers are recalculated. Moreover, as soon as one improves the distance to the received point, one updates the radius of the sphere, which enables the search to be accelerated. Finally, the output vector of the algorithm is the point of the constellation produced the closest to the received point z.

Sphere decoding using the Pohst enumeration is quite slow on account of the systematic scanning of the intervals of validity from their lower bounds.

Sphere decoding using the Schnorr-Euchner enumeration is substantially faster than the previous decoding. It is based on the principle that it is more efficient to carry out a search from a point ê of the product constellation corresponding to a first estimation of the signal transmitted. More precisely, this point is obtained by means of a ZF-DFE type equalisation: one subtracts the interference due to one layer (one user) from the following (lower) layers, the decision at each layer being taken by the sphere decoder.

I.e., by beginning by the layer P:

$$\hat{e}_i = \text{round}(e_i) \text{ with} \quad (11)$$

$$e_P = z_P/r_{P,P}$$

$$e_i = (z_i - \xi_i)/r_{ii} \text{ and } \xi_i = \sum_{j=i+1}^{P} r_{i,j}\hat{e}_j \text{ for } i = P-1, \ldots, 1$$

where round(y) represents the odd relative integer (with the previous form of linear transformation 1) the closest to y.

Each layer i contributes to the quadratic distance from the point a of the network to the received point z for $d_i = r_{ii}(a_i - e_i)^2$.

The search for the closest neighbour is carried out in each layer i by considering successively the coordinates $\hat{e}_i, \hat{e}_i + 2\delta_i, \hat{e}_i - 2\delta_i, \hat{e}_i + 4\delta_i, \hat{e}_i - 4\delta_i$, etc. where $\delta_i = \text{sgn}(e_i - \hat{e}_i)$. It will be understood that one thereby starts from $\hat{e}_i$ and that one progresses in zigzag on either side of this estimation while at the same time being sure to remain within the interval of validity.

Figure 3:
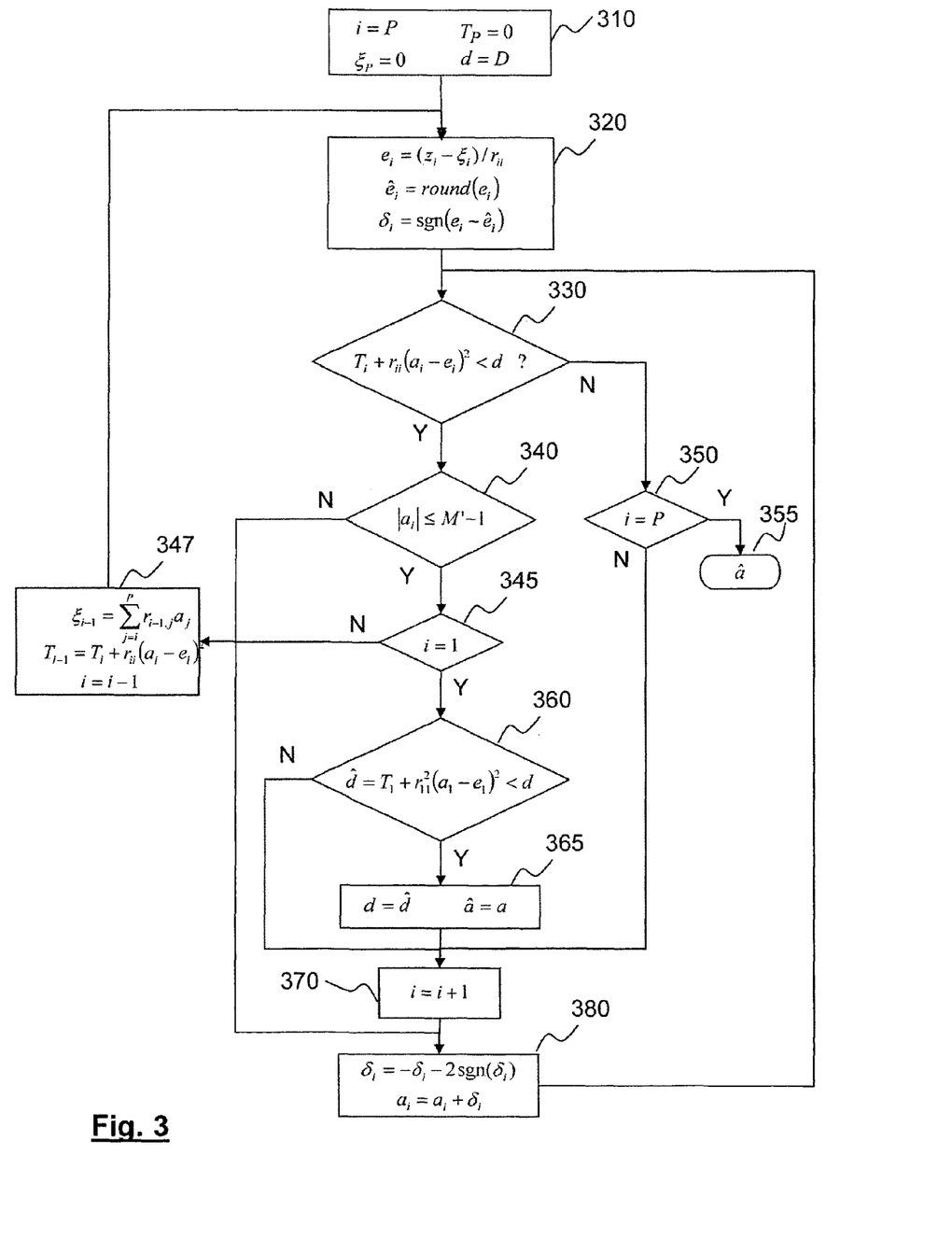
FIG. 3 represents the flow diagram of a second sphere decoding algorithm known from the prior art.

FIG. 3 represents a flow diagram of the sphere decoding method using a Schnorr-Euchner enumeration.

At step 310, one initialises the layer index, the intermediate variables and the search radius of the sphere, i.e.: i=P; $\xi_P$=0; $T_P$=0; d=D where D is the initial quadratic radius of the search sphere.

At step 320, one carries out the ZF-DFE equalisation: $\hat{e}_i$=round($e_i$) with $e_i=(z_i-\xi_i)/r_{ii}$, and one determines the initial coordinate value $a_i=\hat{e}_i$ as well as the initial search direction: $\delta_i=\text{sgn}(e_i-\hat{e}_i)$.

At step 330, one tests if the point is in the sphere, in other words if $T_i+r_{ii}(a_i-e_i)^2<d$. In the negative one moves on to step 350. In the affirmative, one verifies in 340 that it is indeed in the constellation, in other words that $|a_i| \leq M'-1$. If this is not the case, one moves on to step 380.

If the candidate $a_i$ is in the interval of validity (projection of the intersection of the sphere and the constellation), one tests in 345 if one has reached the lowest layer, i–1. If this is the case, one continues in 360.

If not, one updates in 347 the intermediate variables:

$$\xi_{i-1} = \sum_{j=i}^{P} r_{i-1,j}a_j, \quad T_{i-1} = T_i + r_{ii}(a_i - e_i)^2$$

and one decrements i by 1. One returns then to step 320.

One tests in 350 if i=P. If this is the case, the algorithm ends in 355, if not, one moves on to step 370 to increment i by 1.

At step 345, if i=1, one has reached the lowest layer and therefore a point candidate has been found. One adds the contribution of this layer to obtain the distance of the candidate selected to the point z, i.e. $\hat{d}=T_1+r_{11}^2(a_1-e_1)^2$. One compares in 360 this distance to the current quadratic radius d. If it is lower than d, one updates the distance d=$\hat{d}$ and the closest neighbour â=a in 365. In all cases, one goes through 370 to increment i by 1.

Finally, at step 380, one updates $a_i$ by $a_i=a_i+\delta_i$ with $\delta_i=-\delta_i-2\text{sgn}(\delta_i)$ and one returns to step 330.

Figure 4A:
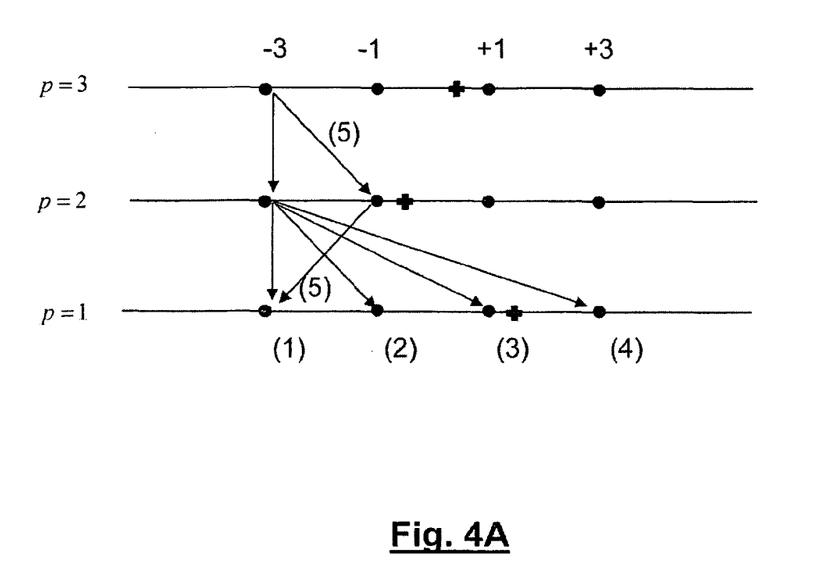
FIGS. 4A and 4B illustrate the scanning of points used respectively by the first and the second sphere decoding algorithm.
Figure 4B:
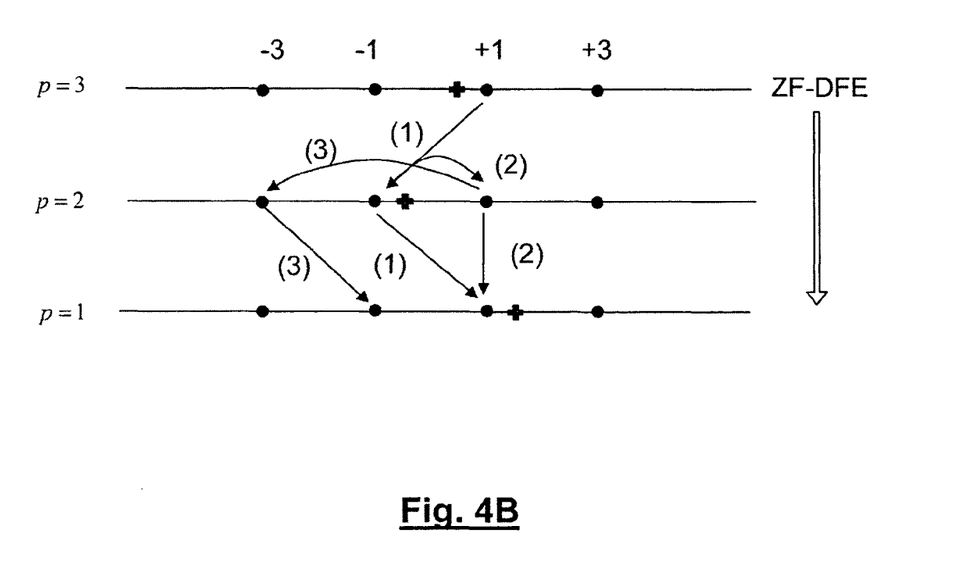

FIGS. 4A and 4B schematically represent the scanning of points according to the Pohst enumeration and that of Schnorr-Euchner, respectively. It has been assumed that the constellation was 4-PAM and that the number of sources P was 3. The different lines correspond to the projections according to the P=3 dimensions. One has represented by crosses the components of z and by circles the points of the PAM modulation constellations. In both cases, the branches successively covered by the algorithm have been indicated by (1), (2) etc.

While sphere decoding has been the subject of numerous studies for PAM and QAM modulations, it has only been envisaged recently for PPM (Pulse Position Modulation) modulations. A sphere decoding for this type of modulation has been proposed for a pulsed type UWB MIMO system in the article of C. Abou-Rjeily et al. entitled "MIMO UWB communications using modified Hermite pulses", published in Proc. of the 17th Annual IEEE Internal Symposium on Personal, Indoor and Mobile Communications (PIRMC' 06). It will be recalled that a pulsed UWB system is a system using the transmission in base band of very brief pulse frames (of the order of several picoseconds). The symbols transmitted belong to a modulation alphabet M-PPM or, in a more general manner, to a hybrid modulation M-PPM-M'-PAM. The cardinal of the modulation alphabet is MM'. For each of the M temporal positions, M' modulation amplitudes are possible. A symbol a of this alphabet may be represented by a sequence $a_m$, m=0, ..., M–1 with $a_m=\delta(m-\mu)\alpha$ where $\mu$ is a position of the modulation M-PPM, $\alpha$ an amplitude of the PAM modulation and $\delta(.)$ the Dirac distribution. Each PPM or PPM-PAM symbol modulates the temporal positions and, if necessary, the temporal positions and the amplitudes of the elementary pulses of a frame.

One may consider a symbol M-PPM (resp. M-PPM-M'-PAM) as a vector of dimension M, of which only one of the components is equal to 1 (resp. $\alpha$) and the others are zero. Unlike a QAM modulation, the components of a PPM or PPM-PAM symbol are therefore not independent.

If it is assumed that P sources transmit PPM symbols, the space of the signals to be considered is of dimension MP. In this space, each source is represented by a layer, itself composed of M temporal positions (or sub-layers) of a PPM or PPM-PAM symbol.

The sphere decoding described in the above mentioned article proposes treating in a joint manner M consecutive layers on account of their interdependency.

The relation (8) is then replaced by a constraint linking M successive sub-layers, i.e. for the layer of order p:

$$\sum_{m=1}^{M} \left| z_m^{(p)} - \sum_{j=f(p,m)}^{PM} r_{f(p,m),j}a_j \right|^2 \leq d - T_p \quad (12)$$

where:

$z^{(p)}$ is a sub vector of z, representative of the signal received, in other words the vector z is formed by concatenation of P vectors $z^{(1)}, \ldots, z^{(P)}$ each corresponding to a source, $z_m^{(p)}$ being the $m^{th}$ component of the PPM or PPM-PAM symbol emitted by this source;

the function $f$ is given by $f(p,m)=(p-1)M+m$;

$T_p$ is the sum of the contributions to the quadratic distance of the layers $p+1, \ldots, P$.

Given that, for each source p, the transmission only takes place for a single position $c(p)\in\{1, \ldots, M\}$, the expression (12) may be rewritten in the form:

$$\sum_{m=1}^{M} |z_m^{(p)} - r_{f(p,m),f(p,c(p))} a_{f(p,c(p))} - E'_{p,m}|^2 \leq d - T_p \quad (13)$$

with $$E'_{p,m} = \sum_{j=f(p+1,1)}^{PM} r_{f(p,m),j} a_j,$$

or instead in the more compact form:

$$\|z^{(p)} - a_{c(p)}^{(p)} R_{.,c(p)}^{(p,p)} - E_{.,p}\|^2 \leq d - T_p \quad (14)$$

where the vector a, like the vector z, is a concatenation of P vectors $a^{(1)}, a^{(2)}, \ldots, a^{(P)}$, the vector $a^{(p)}$ being of components $a_m^{(p)} = a_{f(p,m)}$, $m=1, \ldots, M$;

$R^{(i,j)}$ is a sub-matrix M×M of R constituted of the elements $r_{m,m'}$ with $m=(i-1)M+1, \ldots, iM$ and $m'=(j-1)M+1, \ldots, jM$; for a given matrix $\Omega$, $\Omega_{.,k}$ conventionally designates the $k^{th}$ column of this matrix;

$E_{.,p}$ is the $p^{th}$ column of a matrix E and is defined by $$E_{.,p} = \sum_{p'=p+1,1}^{P} a_{c(p')}^{(p')} R_{.,c(p')}^{(p,p')}.$$

It will be understood from the expression (14) that the M sub-layers corresponding to the source p are treated jointly. In particular, the bounds of the intervals of validity of each of the components $a_m^{(p)}$, $m=1, \ldots, M$ are determined at the same time. These bounds depends on the candidates $a^{(p+1)}, \ldots a^{(P)}$ already chosen for the upper layers.

The enumeration technique used in this sphere decoding may be considered as an extension of a Pohst enumeration. The temporal positions of each layer are scanned one by one, from their lower bounds, by taking the precaution of only selecting one position per layer. The convergence of the decoding is therefore relatively slow.

Furthermore, the direct application of a Schnorr-Euchner type enumeration technique is far from being trivial since the sub-layers, in other words the PPM positions of a same layer, are not independent.

The aim of the present invention is to propose a sphere decoding method for a plurality of PPM sources, which converges more rapidly than that known from the prior art.

DESCRIPTION OF THE INVENTION

The present invention is defined by a sphere decoding method for maximum likelihood receiver intended to receive PPM symbols from a plurality P of sources, each source emitting a flow of PPM symbols at M modulation positions, P PPM symbols emitted simultaneously by the P sources being represented by a point of the modulation product constellation in a space of the signals transmitted of dimension MP decomposed into P layers, each layer representing the M possible modulation positions of a PPM symbol emitted by this source, the signal received by said receiver being transformed into a point representative of this signal, referred to as the received point, in the space of the signals transmitted, said method determining the point of the product constellation the closest to the received point within a sphere of given quadratic radius. According to said method, for each layer of rank p:

(a) one carries out a ZF-DFE equalisation of the signal received in said layer considering the PPM symbols estimated in the P-p previous layers, referred to as layers higher than the layer p;

(b) one classifies in a list the M PPM symbols of said layer as a function of the contributions that they would make to the quadratic distance to the received point;

(c) one selects the PPM symbol making the lowest contribution and one adds this contribution to those obtained for the previous layers to obtain a sum of contributions;

the steps (a), (b), (c) being repeated until one attains the lowest layer; and one updates the quadratic radius of the sphere and said closest point if said sum of contributions is lower than the quadratic radius of the sphere.

Advantageously, if for a given layer and a PPM symbol selected in this layer, said sum of contributions exceeds the quadratic radius of the sphere, one passes on to the upper layer and one selects in this layer the following symbol from the list that is associated with it.

If all the symbols of said associated list have already been the subject of a selection, one passes on to the yet upper layer to select within this latter layer the following symbol in the list that is associated with it.

If one has reached the highest layer and that, either one has selected all the PPM symbols of said layer, or the contribution of said layer calculated for the selected symbol exceeds the quadratic radius of the sphere, the decoding method ends by providing said closest point.

According to one embodiment, the PPM symbols of the respective sources of ranks $1, \ldots, P$, estimated in the sense of the maximum likelihood, are obtained as sub-vectors ($\hat{a}_{opt}^{(1)}$, $\hat{a}_{opt}^{(2)}, \ldots \hat{a}_{opt}^{(P)}$) of M components of the vector of MP components representing said closest point ($\hat{a}_{opt}$).

The contribution $d_p$ of a layer of rank p, $p\in\{1, \ldots, P\}$ is advantageously calculated by:

$$d_p = \|R_{.,m}^{(p,p)} - E^{(p)}\|^2 \text{ with } E^{(p)} = R^{(p,p)} \eta^p \text{ where}$$

$R^{(p,p)}$ is the $p^{th}$ sub-matrix of size M×M on the diagonal of the upper triangular matrix R of size MP×MP, obtained by QR transformation of a matrix H representative of the transmission channel between the P sources and said receiver;

$\eta^p$ is the result of the ZF-DFE equalisation at the layer p;

$R_{.,m}^{(p,p)}$ is the $m^{th}$ column of the matrix $R^{(p,p)}$, where $m\in\{1, \ldots, M\}$ is the modulation position of the PPM symbol selected in the layer p; and $\|\Omega\|^2 = \Omega^T \Omega$.

The sorting of the positions $m\in\{1, \ldots, M\}$ of the PPM symbols of the layer p may be achieved by ordering these symbols according to the values:

$$\{-2(R_{.,m}^{(p,p)})^T E^{(p)} + (R_{.,m}^{(p,p)})^T R_{.,m}^{(p,p)}; m=1, \ldots, M\}$$

The PPM symbol of the layer p making the lowest contribution corresponds to the modulation position pos(p) obtained preferably by:

$$pos(p) = \arg\min_{m}\left(-2(R_{.,m}^{(p,p)})^T E^{(p)} + (R_{.,m}^{(p,p)})^T R_{.,m}^{(p,p)}\right)$$

The invention is further defined by a maximum likelihood receiver intended to receive PPM symbols from a plurality P of sources, comprising a filter matched to the transmission channel between the sources and the receiver and, if necessary, the spatial-temporal coding used in the emission, said receiver moreover comprising sphere decoder means for carrying out the steps of the sphere decoding method according to one of the previous claims, the sphere decoder receiving in input the output of said matched filter.

BRIEF DESCRIPTION OF DRAWINGS

Other characteristics and advantages of the invention will become apparent by reading a preferential embodiment of the invention and by reference to the accompanying drawings in which.

DETAILED DESCRIPTION OF SPECIFIC EMBODIMENTS

We will consider hereafter a system comprising P sources of PPM symbols. The modulation alphabet comprises M temporal positions. As indicated above, the sources of symbols may be flows of symbols emitted by the antenna of a MIMO terminal, flow of symbols from or to a plurality of users, or instead a combination of these two situations if each terminal user is equipped with a plurality of antenna. In the general case, $$P = \sum_{k=1}^{K} i_k$$

where $i_k$ is the number of antenna of the terminal of the user k and K the number of users. It will be assumed hereafter that the flows of symbols are emitted in a synchronous manner. These flows of symbols modulate advantageously but not necessarily frames of pulsed UWB signals.

The receiver is adapted to calculate P'M decision variables with P'>P. For example, each receiving antenna is equipped with a Rake receiver adapted to separate L paths, and for each path the M temporal positions of the PPM modulation. The decision variables are then the P'M outputs of these Rake receivers with P'=L.P$^r$, where P$^r$ is the number of receiving antenna. If a spatial-temporal coding is used at the emission, a filtering matched to this code is used at the receiving side to separate the different users and in this case P'=L.P$^r$.P.

In all cases, the signal received by the receiver may be represented by a vector x of dimension P'M corresponding to the P'M decision variable values. The vector x may be expressed, by adopting the same notations as for equation (1), in the form x=Ha+n, except that the vector n is here of dimension P'M, the vector a of dimension PM and the matrix H of size P'M×PM. The vector a may be considered as the concatenation of P sub-vectors $a^{(1)}, a^{(2)}, \ldots, a^{(P)}$ each sub-vector being relative to a source. The matrix H represents the transmission channel and takes into account the multi-user and multi-path interferences.

If R is the matrix of size PM×PM obtained by QR transformation of the matrix H, $z=Q^T x$ is an exhaustive information (resume) of the signal received belonging to the space of the signals transmitted. The sphere decoding consists in searching the point â, belonging to the intersection of the product constellation and of a noise sphere centred on z and for which the distance to z is minimal. By product constellation we mean the constellation generated by all the positions of the elementary PPM constellations. The receiver determines among the $M^P$ points of the product constellation, in other words among the $M^P$ combinations of possible PPM symbols emitted by the P sources, that which meets the criterion of maximum likelihood. One notes, as previously, for any matrix $\Omega$ of size PM×PM, $\Omega^{(i,j)}$ the sub-matrix of size M×M of R constituted of the elements $\omega_{m,m'}$ with m=(i-1)M+1, ..., iM and m'=(j-1)M+1, ..., jM, with $1 \leq i,j \leq P$ and $\Omega_{m,m'}^{(i,j)}$ the (m,m')th element of the matrix $\Omega^{(i,j)}$, in other words $\Omega_{m,m'}^{(i,j)} = \omega_{m,m'}$.

The decoding method uses a ZF-DFE equalisation of the transmitted signal. More precisely, one firstly calculates:

$$e_p = V_z \text{ with } V = R^{-1} \tag{15}$$

or more simply since one begins by the final layer (layer of order P), on account of the upper triangular shape of the matrix R:

$$e_P^{(P)} = V^{(P,P)} z^{(P)} \text{ with } V^{(P,P)} = (R^{(P,P)})^{-1} \tag{16}$$

The vector $e_P^{(P)}$ is of dimension M and has real values. One determines the PPM symbol $\hat{a}^{(P)}$ the closest to $e_P^{(P)}$ in the sense of a certain distance that we will detail hereafter. It will be seen that this minimisation of distance comes down to searching the index of the first component of the set of components of $e_P^{(P)}$ sorted according to an order relation. One notes pos(P) the index of this component. The ZF-DFE estimation of $z^{(P)}$ is none other than $\hat{a}^{(P)} = \hat{e}_P^{(P)} = I_{.,pos(P)}^M$ where $I^M$ is the unit matrix of size M×M, in other words $\hat{a}^{(P)}$ is a vector of size M, the components of which are zero with the exception of that of index pos(p), equal to 1.

One notes $\hat{e}_p$ the vector of size MP of which the (P-1)M first components are zero and the M last are equal to those of $\hat{e}_P^{(P)}$.

One subtracts from the lower layers the interference due from the layer P and one then estimates $\hat{a}^{(P-1)}$, more precisely:

$$e_{P-1} = V(z - R\hat{e}_P), \tag{17}$$

or instead, since R and V are upper triangulars:

$$e_{P-1}^{(P-1)} = V^{(P-1,P-1)}(z^{(P-1)} - R^{(P-1,P)}\hat{e}_P^{(P)}) + V^{(P-1,P)}(z^{(P)} - R^{(P,P)}\hat{e}_P^{(P)}) \tag{18}$$

and the ZF-DFE estimation is none other than $\hat{a}_{P-1} = \hat{e}_{P-1}^{(P-1)} = I_{.,pos(P-1)}^M$ where pos(P-1) is the index of the first component after the sorting operation, as previously indicated.

One proceeds in this way layer by layer, by eliminating at each layer p, the interference due to the P-p upper layers. When the P layers have been subjected to the ZF-DFE equalisation, one has a vector â defined by the concatenation of $\hat{a}^{(p)}$ for p=1, ..., P.

This vector may be represented by a point of the product constellation. One begins at this point to search for the closest neighbour of z. The search then continues within said constellation, according to an enumeration method described hereafter.

It has been seen above that, for each layer p, one determined the symbol $\hat{a}^{(p)}$ the closest to $e_p^{(p)}$. In order to lighten the notations, we note here $\alpha^p = \hat{a}^{(p)}$ and $\eta^p = e_p^{(p)}$. The contribution of this layer to the quadratic distance between z and â may be written:

$$d_p = \sum_{m=1}^{M} \left( \sum_{m'=m}^{M} R_{m,m'}^{(p,p)}(\alpha_{m'}^p - \eta_{m'}^p) \right)^2 = \|R^{(p,p)}(\alpha^p - \eta^{(p)})\|^2 \quad (19)$$

since R is upper triangular. $\alpha^p$ being a PPM symbol, $\alpha_{m'}^P = \delta(m'-m_0)$, $m_0 \in \{1, \ldots M\}$ in other words that one assumes that the pth source transmits a PPM symbol in position $m_0$. The contribution to the quadratic distance is then expressed:

$$d_p = \|R^{(p,p)}(I_{.,m_0} - \eta^p)\|^2 = \|R_{.,m_0}^{(p,p)} - E^{(p)}\|^2 \quad (20)$$

with $E^{(p)} = R^{(p,p)} \eta^p$,

It may be noted that in the absence of interference between the different modulation positions, in other words if the impulse response of the transmission channel is shorter than the temporal distance between these positions, the matrix $R^{(p,p)}$ is diagonal and that the quadratic distance $d_p$ is identical to the quadratic distance between the PPM symbol tested ($m=m_0$) and the signal equalised by source.

For each layer, one can classify the PPM symbols (in other words the PPM positions) from the respective contributions that they would make to the quadratic distance. The first choice in the enumeration of the candidates in this layer concerns, as has been seen above:

$$pos(p) = \arg\min_m \left( \|R_{.,m}^{(p,p)} - E^{(p)}\|^2 \right) \quad (21)$$

then one moves on successively to the positions making higher and higher contributions.

Given that $E^{(p)}$ does not depend on m, the classification of the quadratic distances $d_p$ is equivalent to that of the scalar products:

$$\{-2(R_{.,m}^{(p,p)})^T E^{(p)} + (R_{.,m}^{(p,p)})^T R_{.,m}^{(p,p)}; m=1, \ldots, M\} \quad (22)$$

and consequently:

$$pos(p) = \arg\min_m \left( -2(R_{.,m}^{(p,p)})^T E^{(p)} + (R_{.,m}^{(p,p)})^T R_{.,m}^{(p,p)} \right) \quad (23)$$

The sphere decoding begins with the final layer (layer P). One arranges in order the list of PPM symbols of this layer as a function of the respective contributions that they would make to the quadratic distance to the received point. One selects firstly the PPM symbol which would make the lowest contribution, which gives an estimation of the symbol emitted by the source P. One eliminates the interference generated by this symbol on all the lower layers. One then moves on to the layer immediately lower and one starts again in this way for each layer.

More precisely, for a given current layer one arranges by order the list of PPM positions of this layer as a function of the contributions that they would make to the symbols corresponding to the quadratic distance to the received point. One selects that making the lowest contribution by using (21) or (23). One then eliminates from the lower layers the interference generated by the PPM symbol thus selected.

One progresses in this way layer by layer, the symbols selected in the different layers forming a branch. If the sum of the contributions of the upper layers and the current layer is greater than the current radius of the sphere, one abandons the branch in question and one passes on to the upper layer to the current layer to select a new PPM position. Conversely, one pursues the branch until one attains the layer of rank 1. The quadratic distance between the point â of the product constellation at the received point is obtained as the sum of the contributions of the different layers. If the distance is lower than the current radius of the sphere, the radius as well as the best current point $\hat{a}_{opt}$ are updated. More precisely, the new radius of the sphere takes the value of said distance and $\hat{a}_{opt} = \hat{a}$.

One then returns to the layer immediately above to select the second PPM symbol from the list. One eliminates from the lower layers (here the layer of rank 1) the interference generated by this symbol and one proceeds as previously towards the lower layers.

At each ascent towards an upper layer, one selects successively the different symbols of this layer in the order of the list beginning by the lowest contribution. When the list is used up, in other words when one has already previously tested the M symbols of this list, one passes on to the following upper layer.

One progresses in this way, by successive ascents towards higher and higher layers of ranks and with narrower and narrower intervals of validity (since the radius of the sphere is updated), until one has used up the list of the root layer (layer P), in which case the algorithm stops. In decoding output, the best output point $\hat{a}_{opt}$ is that which achieves the minimum of distance to z. The point $\hat{a}_{opt}$ provides the ML estimation of the PPM symbols transmitted by the P sources, i.e. $\hat{a}_{opt}^{(1)}$, $\hat{a}_{opt}^{(2)}, \ldots, \hat{a}_{opt}^{(P)}$.

Figure 5:
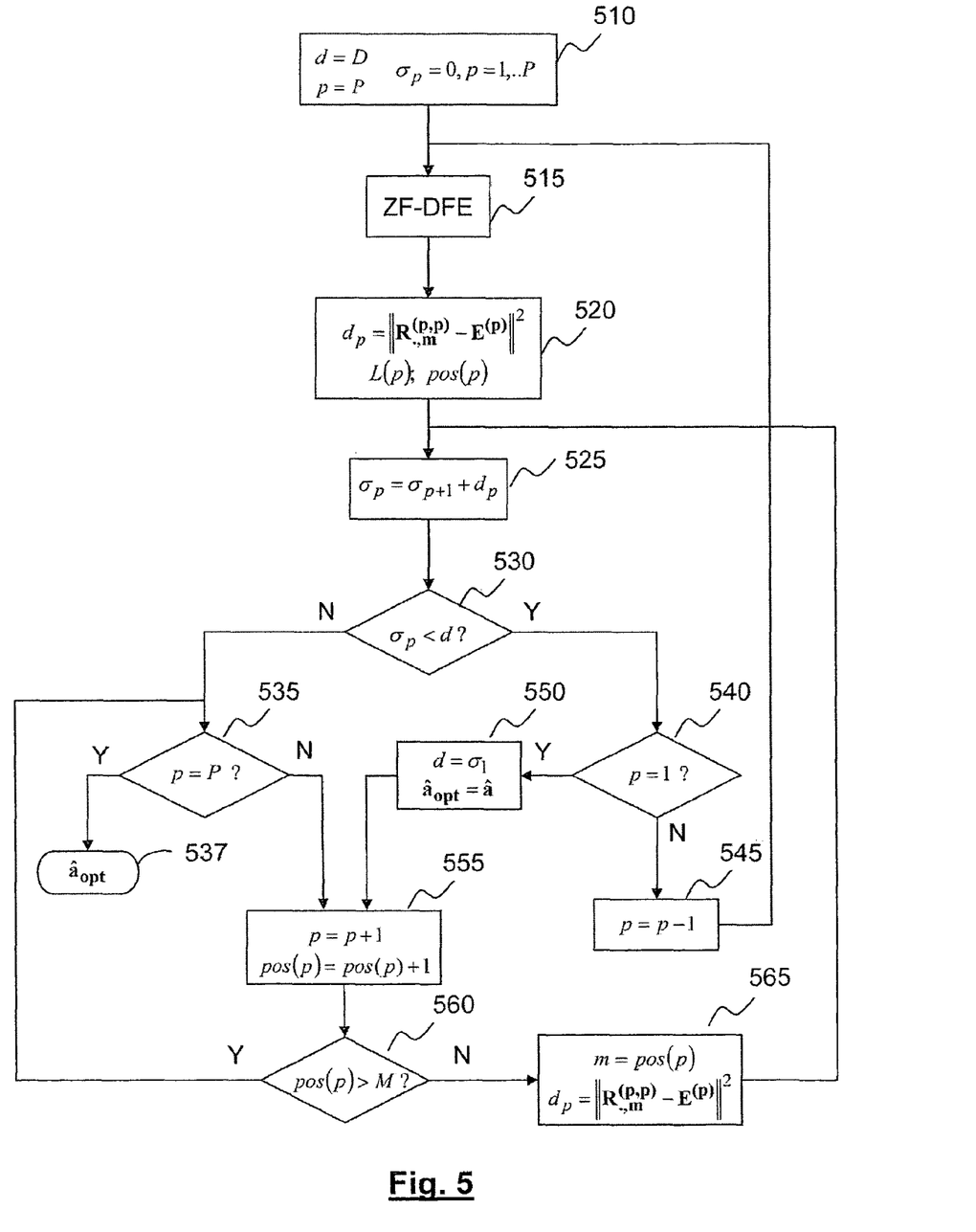
FIG. 5 represents the flow diagram of a sphere decoding algorithm according to an embodiment of the invention.

FIG. 5 represents in a schematic manner the flow diagram of the sphere decoding method of a plurality of PPM sources according to the invention.

At step 510, one initialises the layer index by that of the highest, p=P. One initialises the intermediate variables, particularly the quadratic radius d of the sphere, d=D and P variables representing respectively the sum of the contributions to the quadratic distance up to P respective layers $$\sigma_p = \sum_{k=p}^{P} d_p,$$

i.e. $\sigma_p = 0$ for p=1, ..., P.

At step 515, one carries out the ZF-DFE equalisation of the current layer p considering the symbols $\hat{a}^{(P)}, \hat{a}^{(P-1)}, \ldots, \hat{a}^{(p+1)}$ selected in the previous upper layers.

At step 520, one sorts the PPM symbols of this layer according to the relation of order (20) or (22). One thereby has an ordered list L(p) and one chooses the first PPM symbol of this list.

At step 525, one updates $\sigma_p$ the sum of the contributions of the layers p, ..., P to the Euclidian distance to z, i.e. $\sigma_p = \sigma_{p-1} + d_p$.

One then tests if the sum of these contributions exceeds the current quadratic radius d of the sphere. If this is the case, it is pointless conserving the current branch $\hat{a}^{(P)}, \hat{a}^{(P-1)}, \ldots, \hat{a}^{(p)}$ since it cannot, whatever the symbols that are selected in the following lower layers, lead to the closest neighbour. One then moves on to the test 535. On the other hand, if $\sigma_p$ is lower than said quadratic radius, one moves on to test 540.

In 535, one tests if p=P. If this is the case, the algorithm stops in 537 and the closest neighbour of z belonging to the network is $\hat{a}_{opt}$.

If p≠P, one increments p and pos(p) by 1 in 555, i.e. one moves on to the upper layer and one selects the following PPM symbol in the list L(p), if it exists.

One tests in 560 if one has used up the symbols of the list L(p). In the affirmative (pos(p)>M), one returns to the test 535. In the negative, one updates the value of $d_p$ corresponding to the new symbol selected and one returns to step 525. In practice, if one has previously calculated and stored the values $d_p$ for the different values of m=1, ..., M, it is not necessary to recalculate $d_p$.

If it is decided to conserve the current branch $\hat{a}^{(P)}$, $\hat{a}^{(P-1)}, \ldots, \hat{a}^{(p)}$ in 530, one tests in 540 if this branch has reached the lowest layer (p=1), in which case one has a point of the network improving the current distance to z and one moves on to step 550. If, on the other hand, this is not the case (p≠1), one moves on to the following lower layer in 545, then one returns to the ZF-DFE equalisation step.

At step 550, one updates the radius of the sphere, i.e. $d=\sigma_1$ and the best candidate $\hat{a}_{opt} = \hat{a}$, then the search is continued in incrementing p at step 555.

The best candidate gives a joint ML estimation $\hat{a}_{opt}^{(1)}$, $\hat{a}_{opt}^{(2)}, \ldots \hat{a}_{opt}^{(P)}$ of the PPM symbols emitted by the P sources.

Figure 6:
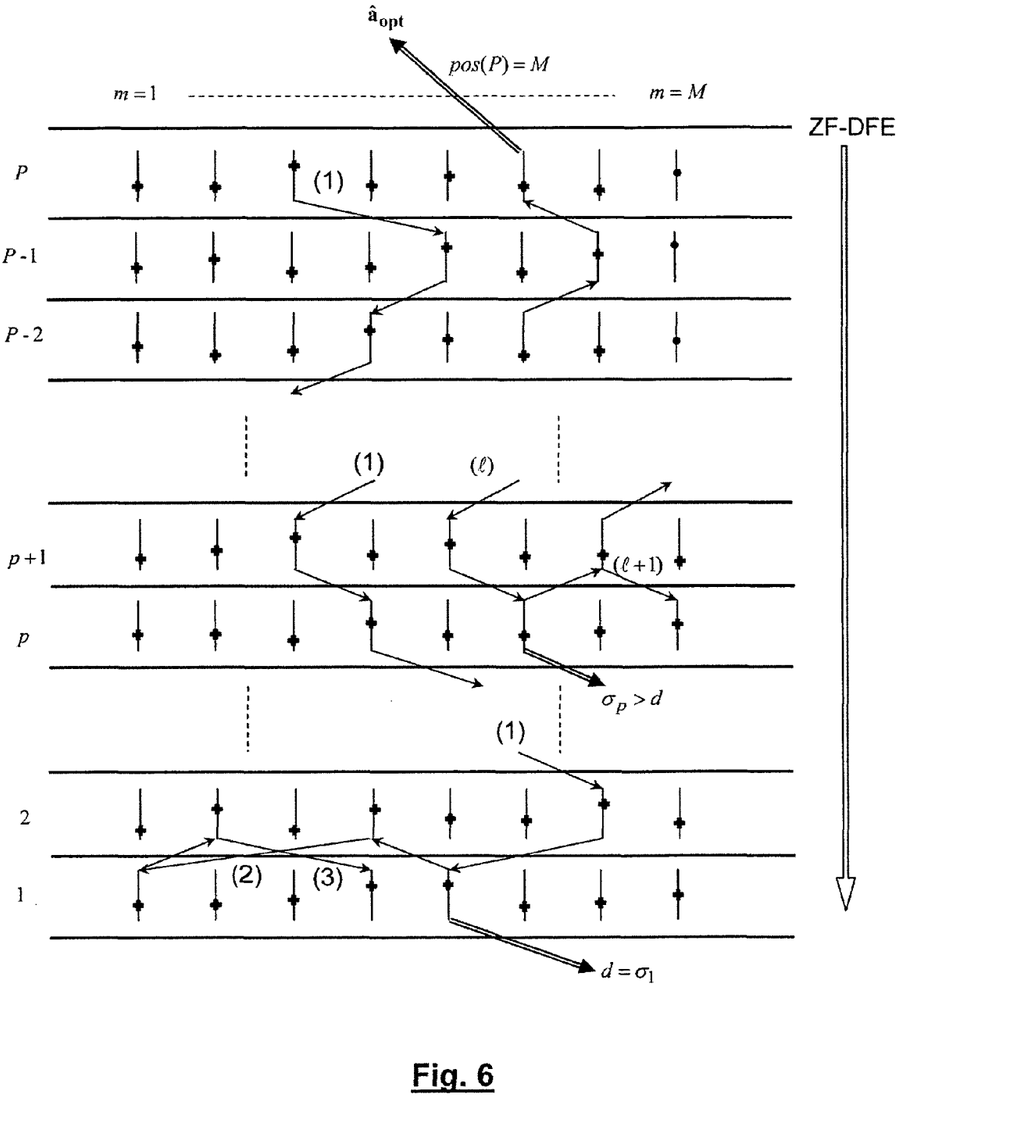
FIG. 6 represents an example of progression through the constellation produced by the sphere decoding algorithm according to the invention.

The progression of the sphere decoding within the product constellation is illustrated in FIG. 6. The space of the symbols transmitted is divided into P layers, each being of dimension M. One has represented in ordinates for each of the PPM positions of each layer p the M components of $e_p^{(p)}$, obtained as has been seen by ZF-DFE equalisation.

The branch noted (1) is the first branch tested. In the present case, the branch progresses up to the lowest layer and improves the quadratic distance to z. The quadratic radius d of the sphere is then updated. One passes on to the layer 2 and the test of a new branch (2). Given that a new candidate is the layer (2) has been selected, one carries out beforehand a new equalisation of the layer 1.

One has represented by (l) a branch being tested. It may be noted that when this branch reaches the layer p, the sum $\sigma_p$ of the contributions of the upper layers and the current layer P, P−1, ..., p, exceeds the quadratic current radius d of the sphere. The search continues by moving to the upper layer p+1 and by selecting in this layer the following PPM symbol in the list L(p+1) (cf. step 555 of FIG. 5). One then updates the sum of the contributions, $\sigma_{p+1}$. If this sum is lower than d one continues with the new branch (l+1), if not one ascends a layer.

When one reaches the highest layer (cf. step 535 of FIG. 5) and that either one has used up the symbols of the list L(P), or the contribution of the layer P exceeds d, the decoding algorithm ends by providing $\hat{a}_{opt}$.

The pseudo-code of the sphere decoding method according to a possible embodiment of the invention is given in the appendix. The following notations have been adopted:

$0_M$ is the null vector of size M;

$\rho$ is a vector of size M;

e and E are matrices of size MP×P, the columns of e give the result of the ZF-DFE equalisation;

A matrix of sizes M×P, the columns of which are the PPM symbols selected for the different layers;

Order matrix of size M×P, the columns of which give the abovementioned lists of indexes L(p) for each of the layers;

Diag($\Omega$) is the diagonal matrix composed of diagonal elements of the matrix $\Omega$;

sort($\omega$) is a vector constituted of components of the vector $\omega$ sorted by increasing order.

The sphere decoding method described above is intended to be implemented by software or hardware means in a ML receiver operating in a multi-source system, for example a MIMO system and/or a multi-user system. Advantageously, the PPM symbols of a source serve to modulate a pulsed signal of the TH-UWB (Time Hopped UWB), DS-UWB (Direct Spread UWB) or TH-DS-UWB type. The signals thus modulated are transmitted for example by means of conventional UWB antenna or laser diodes.

APPENDIX

Sphere decoding (input: z, R, P, M, D; output: $\hat{a}_{opt}$)

Step 1 (Initialisation):

Set k=P+1; dist(k)=0; V=$R^{-1}$; $\rho = 0_M$; bestdist=D.

Step 2: newdist=dist(k)+$\rho^T \rho$;

if (newdist<bestdist) & (k≠1) go to Step 3 else go to Step 4 endif.

Step 3: if P+1, $e_{.,k-1}$=Vz else

For i=1, ..., k−1, $e^{(i)}_{.,k-1} = e^{(i)}_{.,k-1} - V^{(i,k)}\rho$ endfor endif.

k=k−1, dist(k)=newdist, $E^{(k)}_{.,k} = R^{(k,k)} e^{(k)}_{.,k}$,

Order$_{.,k}$=sort$\{-2(R^{(k,k)})^T E^{(k)}_{.,k} + \text{Diag}((R^{(k,k)})^T R^{(k,k)})\}$ step(k)=1, pos(k)=Order$_{step(k),k}$, $A_{.,k}=1_{.,pos(k)}$, $\rho = E^{(k)}_{.,k} - R^{(k,k)}_{.,pos(k)}$, go to Step 2.

Step 4: if newdist<bestdist, bestdist=newdist for i=1, ..., P, $\hat{a}_{opt}^{(i)} = A_{.,i}$ endfor endif.

else if k=P, terminate else k=k+1 endif.

step(k)=step(k)+1, if step(k)>M, go to Step 4 endif, pos(k)=Order$_{step(k),k}$, $A_{.,k}=I_{.,pos(k)}$, $\rho = E^{(k)}_{.,k} - R^{(k,k)}_{.,pos(k)}$, go to Step 2.

The invention claimed is:

1. Sphere decoding method for a maximum likelihood receiver intended to receive PPM symbols from a plurality P of sources, each source emitting a flow of PPM symbols at M modulation positions, P PPM symbols emitted simultaneously by the P sources being represented by a point (a) of the modulation product constellation in a space of the signals transmitted of dimension MP decomposed into P layers, each layer representing the M possible modulation positions of a PPM symbol emitted by this source, the signal received (x) by said receiver being transformed into a point representative (z) of this signal, referred to as the received point, in the space of the transmitted signals, said method determining the point of the product constellation the closest ($\hat{a}_{opt}$) to the received point within a sphere of given quadratic radius, characterised in that, for each layer of rank p:

(a) one carries out a ZF-DFE equalisation of the signal received in said layer considering the PPM symbols estimated in the P-p previous layers, referred to as layers higher than the layer p;

(b) one sorts in a list the M PPM symbols of said layer as a function of the contributions that they would make to the quadratic distance to the received point;

(c) the PPM symbol making the lowest contribution ($d_p$) is selected and this contribution is added to those obtained for the previous layers to obtain a sum of contributions ($\sigma_p$);

the steps (a), (b), (c) being repeated until the lowest layer has been attained; and one updates the quadratic radius of the sphere and said closest point if said sum of contributions is lower than the quadratic radius of the sphere.

2. Sphere decoding method according to claim 1, characterised in that, if for a given layer and a PPM symbol selected in this layer, said sum of contributions exceeds the quadratic radius of the sphere, one passes on to the upper layer and one selects in this layer the following symbol from the list that is associated with it.

3. Sphere decoding method according to claim 2, characterised in that if all the symbols of said associated list have already been the subject of a selection, one moves on to the yet upper layer to select in this latter layer the following symbol in the list that is associated with it.

4. Sphere decoding method according to claim 2, characterised in that if one has reached the highest layer and that, either one has selected all the PPM symbols of said layer, or the contribution of said layer calculated for the symbol selected exceeds the quadratic radius of the sphere, the decoding method ends by providing said closest point ($\hat{a}_{opt}$).

5. Sphere decoding method according to claim 4, characterised in that the PPM symbols of the respective sources of ranks $1, \ldots, P$, estimated in the sense of the maximum likelihood, are obtained as sub-vectors ($\hat{a}_{opt}^{(1)}$, $\hat{a}_{opt}^{(2)}$, ... $\hat{a}_{opt}^{(P)}$) of M components of the vector of MP components representing said closest point ($\hat{a}_{opt}$).

6. Sphere decoding method according to claim 5 characterised in that the contribution $d_p$ of a layer of rank p, $p \in \{1, \ldots, P\}$ is calculated by:

$$d_p = \|R_{.,m}^{(p,p)} - E^{(p)}\|^2 \text{ with } E^{(p)} = R^{(p,p)} \eta^p \text{ where}$$

$R^{(p,p)}$ is the $p^{th}$ sub-matrix of size M×M on the diagonal of the upper triangular matrix R of size MP×MP, obtained by QR transformation of a matrix H representative of the transmission channel between the P sources and said receiver;

$\eta^p$ is the result of the ZF-DFE equalisation at the layer p;

$R_{.,m}^{(p,p)}$ is the $m^{th}$ column of the matrix $R^{(p,p)}$, where $m \in \{1, \ldots, M\}$ is the modulation position of the PPM symbol selected in the layer p; and $\|\Omega\|^2 = \Omega^T \Omega$.

7. Sphere decoding method according to claim 6, characterised in that the sorting of the positions $m \in \{1, \ldots, M\}$ of the PPM symbols of the layer p is carried out by arranging in order these symbols according to the values:

$$\{-2(R_{.,m}^{(p,p)})^T E^{(p)} + (R_{.,m}^{(p,p)})^T R_{.,m}^{(p,p)}; \, m=1, \ldots, M\}.$$

8. Sphere decoding method according to claim 7, characterised in that the PPM symbol of the layer p making the lowest contribution corresponds to the modulation position pos(p) obtained by:

$$pos(p) = \arg\min_m \left( -2(R_{.,m}^{(p,p)})^T E^{(p)} + (R_{.,m}^{(p,p)})^T R_{.,m}^{(p,p)} \right).$$

* * * * *